United States Patent [19]
Kram

[11] Patent Number: 6,112,007
[45] Date of Patent: *Aug. 29, 2000

[54] CONTINUOUS DELAY TELEVISION PICTURE DISPLAY APPARATUS

[76] Inventor: Christine Kram, 6812 Old Harford Rd., Baltimore, Md. 21234

[ * ] Notice: This patent issued on a continued prosecution application filed under 37 CFR 1.53(d), and is subject to the twenty year patent term provisions of 35 U.S.C. 154(a)(2).

[21] Appl. No.: 08/956,304

[22] Filed: Oct. 22, 1997

[51] Int. Cl.[7] .............................. H04N 5/76; H04N 5/775
[52] U.S. Cl. ................................. 386/46; 386/83; 386/92
[58] Field of Search ................................. 386/83, 46, 92, 386/1, 52, 68, 4, 81, 82, 126, 125, 34; 360/32; H04N 5/76, 5/775

[56] References Cited

U.S. PATENT DOCUMENTS

| | | | |
|---|---|---|---|
| 5,047,857 | 9/1991 | Duffield et al. | 358/183 |
| 5,371,551 | 12/1994 | Logan et al. | 348/571 |
| 5,420,642 | 5/1995 | Baek | 348/565 |
| 5,432,561 | 7/1995 | Strubbe | 348/565 |
| 5,440,336 | 8/1995 | Buhro et al. | 348/13 |
| 5,467,144 | 11/1995 | Saeger et al. | 348/566 |
| 5,479,302 | 12/1995 | Haines | 360/69 |
| 5,502,807 | 3/1996 | Beachy | 395/152 |
| 5,555,463 | 9/1996 | Staron | 348/560 |

*Primary Examiner*—Robert Chevalier
*Attorney, Agent, or Firm*—John D. Gugliotta

[57] ABSTRACT

An apparatus to aid in the replaying of previously transmitted video signals for the purposed of reviewing missed information on a television receiver is disclosed. Comprising a television tuner whose output signal passes through a video recording system, it utilizes conventional recording technology with the use of a continuous loop tape. The output signal from the tuner is also passed on to a television monitor under normal, standby operation. In the instance where a viewer wishes to review a just viewed signal, such as might occur during a missed word or word sequence such as a telephone number, the viewer is able to switch over to the stored signal on the videotape for a replay of said signal. The replay will continue as many times as desired by the viewer until all necessary information is absorbed. The stored sequence time duration is variable in nature and user selectable. The viewer may view the replayed signal in a picture-in-picture window or may view the replayed signal on the full screen. When completed, the viewer would switch back to real time viewing at which point the video recording process would begin anew. The viewer also has the option of viewing one selected image on a continuous "stop frame" basis and also has the option of producing a hard copy, printed image from an integral printing means.

8 Claims, 3 Drawing Sheets

CONTINUOUS DELAY TELEVISION PICTURE DISPLAY APPARATUS

RELATED APPLICATIONS

The present invention is a continuation of Disclosure Document Number 415,728 filed on Mar. 17, 1997.

BACKGROUND OF THE INVENTION

1. Field of the Invention

The present invention relates generally to television picture displays and more particularly, to an apparatus that allows for the redisplay of any viewed television image within a variable time period of short duration.

2. Description of the Related Art

In the related art, numerous attempts have been made to improve the control features a viewer possesses over a television image. These improvements have ranged from picture-in-picture control schemes to complex digital storage mechanisms using multiple input sources, digital to analog conversion circuits and the like. A search of the prior art did not disclose any patents that read directly on the claims of the instant invention; however, the following references were considered related:

| U.S. Pat. No. | Inventor | Issue Date |
| --- | --- | --- |
| 5,555,463 | Alain Staron | Sep. 10, 1996 |
| 5,502,807 | Jeffrey Beachy | Mar. 26, 1996 |
| 5,467,144 | Timothy Saeger et al. | Nov. 14, 1995 |
| 5,440,336 | William Buhro et al. | Aug. 8, 1995 |
| 5,432,561 | Hugo Strubbe | Jul. 11, 1995 |
| 5,420,642 | Woon Baek | May 30, 1995 |
| 5,371,551 | James Logan et al. | Dec. 6, 1994 |
| 5,047,857 | David Duffield et al. | Sep. 10, 1991 |

The previous art consists of several devices in which the television viewer is able to view images that were previously transmitted. These devices, however, have one or more of the following problems.

First, the devices can be complex using highly specialized circuitry and low production volume integrated circuits. This factor may cause the devices to be expensive to manufacture. The public is less likely to purchase an expensive continuous delay television picture display apparatus.

Second, some of the devices are to be utilized picture-in-picture control schemes and thus are unsuitable for full screen viewing.

Third, some of the devices utilize digital storage means thus requiring the incoming analog signal to be converted. Such storage and conversion circuitry increases the above-mentioned cost problems, while also causing degradation and signal loss problems due to the inefficiencies of the conversion process.

Fourth, many of the previous devices require the use of a complex control interface which many viewers do not have the technical skill to operate, or do not have the patience or desire to learn.

Fifth, some of the previous devices utilize outboard storage mediums which increase the complexity and require interface cabling to connect to existing television receivers.

Sixth, some of the previous devices utilize off-site storage mediums which increase the complexity and require increased communication bandwidth to display the desired image on television receivers.

Seventh, some of the previous devices do not allow for a "stop frame" function which would be used to view a detailed screen image such as an address or telephone number. The lack of such a feature may cause an individual to inaccurately decipher said detailed images.

Eighth, the previous devices do not allow for the capability to produce a hard copy, printed, output from the televised image.

Consequently, a need has therefore been felt for an improved but less complex mechanism that allows for a continuous delay television picture display apparatus.

SUMMARY OF THE INVENTION

It is therefore an object of the present invention to provide an improved continuous delay television picture display apparatus.

It is therefore another object of the present invention to provide for an improved continuous delay television picture display apparatus that allows for the effective reviewing of images just viewed, during a time period of short duration, which is variable in nature as selected by the user.

It is yet another object of the present invention to provide for an improved continuous delay television picture display apparatus that is integral to the television receiver and does not require the use of external components.

It is yet another object of the present invention to provide for an improved continuous delay television picture display apparatus that is easily operable by the common viewer and does not require the use of a complex setup or programming commands.

It is yet another object of the present invention to provide for an improved continuous delay television picture display apparatus that may utilize existing picture-in-picture or utilize conventional full screen displays.

It is still yet another object of the present invention to provide for an improved continuous delay television picture display apparatus that allows for a "stop-frame" function to freeze a selected televised image for an indefinite time period.

It is even yet another object of the present invention to provide for an improved continuous delay television picture display apparatus that allows for the production of a hard copy, printed output of a selected screen image from an integral printing apparatus.

Briefly described according to the preferred embodiment of the present invention, the invention comprises a television tuner whose output signal passes through a video recording system utilizing conventional recording technology with the use of a continuous loop tape. The output signal from the tuner is also passed on to a television monitor under normal, standby operation. In the instance where a viewer wishes to review a just viewed signal, such as might occur during a missed word or word sequence such as a telephone number, the viewer is able to switch over to the stored signal on the videotape for a replay of said signal. The replay will continue as many times as desired by the viewer until all necessary information is absorbed. The stored sequence time duration is variable in nature and user selectable. The viewer may view the replayed signal in a picture-in-picture window or may view the replayed signal on the full screen. When completed, the viewer would switch back to real time viewing at which point the video recording process would begin anew. The viewer also has the option of viewing one selected image on a continuous "stop frame" basis and also has the option of producing a hard copy, printed image from an integral printing means.

An advantage of the present invention is that it is simple, and therefore. inexpensive to manufacture. This savings, if passed on to the consumer, may influence the public to utilize such a device. A simple design also increases product reliability and useful product lifetime.

Another advantage of the present invention is that it is utilizes existing readily available recording/playback technology.

Another advantage of the present invention is that it is easily produced from readily available materials using known manufacturing techniques, thus allowing for an economical product.

Another advantage of the present invention is that a user is capable of producing a hard copy, printed output on paper at any time, so that detailed information such as addresses and/or telephone numbers may be written down without the presence or use of a pen or pencil.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
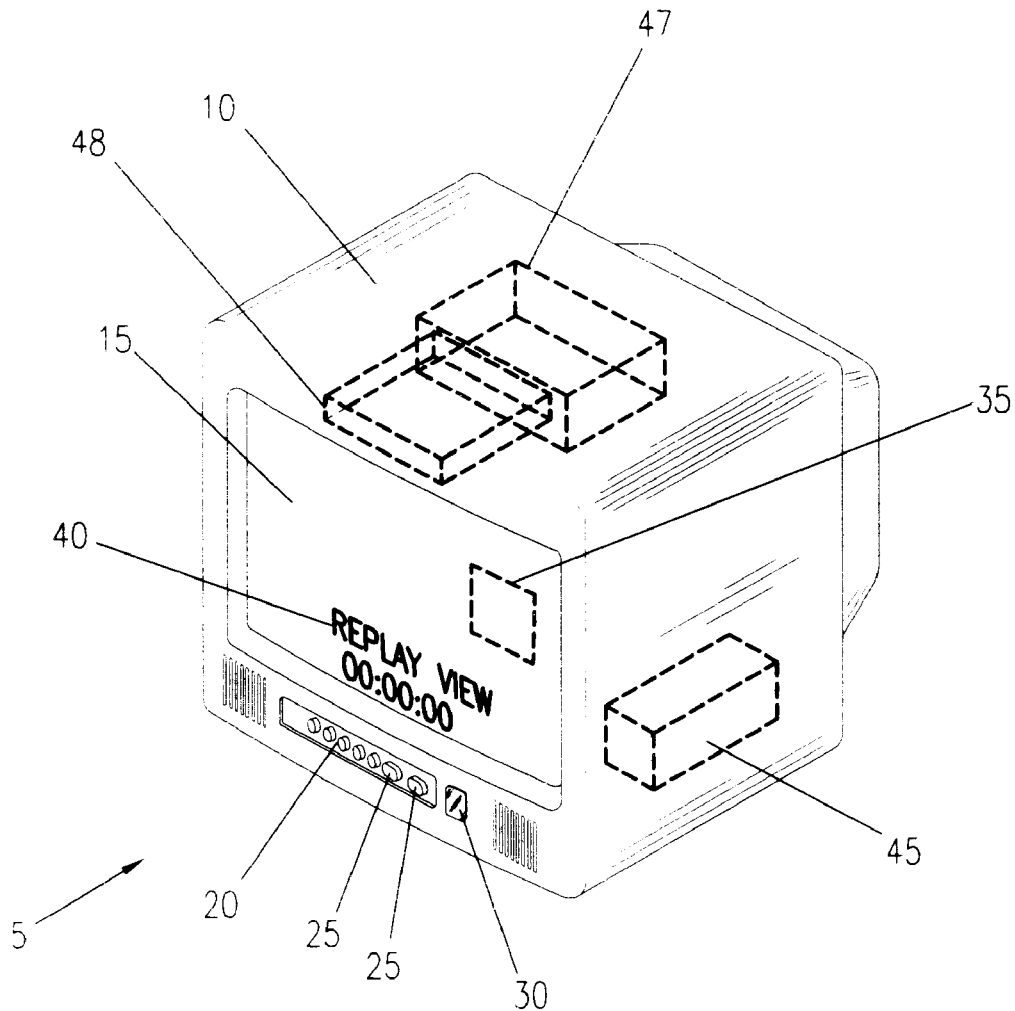
FIG. 1 is a perspective view of the continuous delay television picture display apparatus shown in a utilized state displaying just recorded information in picture-in-picture window according to the preferred embodiment of the present invention.

Referring now to FIG. 1, a perspective view of a continuous delay television picture display apparatus 5 is shown in a utilized state according to the preferred embodiment of the present invention. A television receiver 10 of conventional design is depicted with a monitor screen 15 and a control section module 20. The control section module 20 is of a conventional design and contains such elements as a power switch, volume control, channel selections. menu selector, and the like. The control section module 20 possesses similar traits to those units found on conventional current technology television receivers and can take many different final forms. The control section module 20 also contains a review activation switch bank 25 which will activate the review function of the continuous delay television picture display apparatus 5 as will be explained in greater detail hereinbelow. The control section module 20 also contains an infrared interface 30 which interfaces to a remote control unit (not shown). The abovementioned functions controlled by the control section module 20 may also be controlled by the infrared interface 30 including the function of the review activation switch bank 25. Shown displayed on the monitor screen 15 is a picture-in-picture insert 35 for purposes of viewing the replayed image. It is envisioned that the replayed image would also be viewable as a full screen picture as selectable via the control section module 20 and the associated infrared interface 30. This FIG. however displays the replayed image as a small picture, as selectable via the control section module 20 and the associated infrared interface 30, which provides the added benefit of viewing the live broadcast on the full screen. Also present on the monitor screen 15 is a review function status area 40 which would indicate to the viewer that the continuous delay television picture display apparatus 5 is in replay mode as well as the current time remaining or replay able material. A record/playback module 45 is located internal to the case of the television receiver 10 as indicated by the dashed outline. The record/playback module 45 is of an analog nature and utilizes current technology with regards to recording and playback of the composite video and audio signal. It is envisioned that module 45 would also be capable of conversion or upgrade from existing analog technology to digital television or high definition digital television technology. The tape used inside of the record/playback module 45 is of a continuous loop nature and is envisioned to be of a heavy-duty, high quality design suitable for long term, continuous use. Finally, a printing means 47, such as a laser, inkjet or thermal printer is located internal to the case of the television receiver 10 as indicated by the dashed outline, and provides a means for producing a hard copy, printed image of any selected still image present on the monitor screen 15. The printed output exits the continuous delay television picture display apparatus 5 by means of a printing output port 48.

Figure 2:
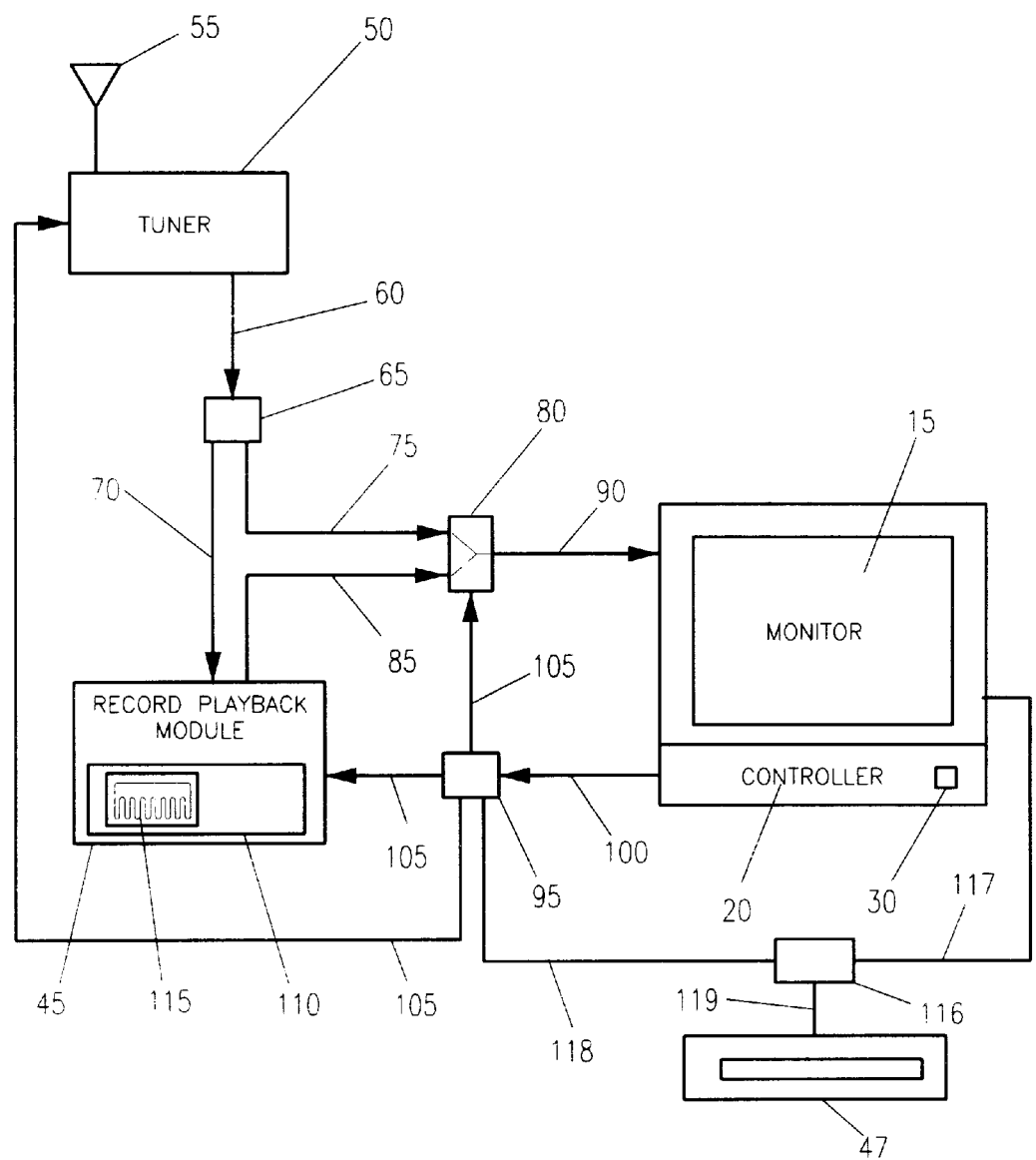
FIG. 2 is a schematic block diagram depicting the major components of the present invention.

Referring next to FIG. 2, a schematic block diagram depicting the major components of the continuous delay television picture display apparatus 5 is shown. A tuner 50 is shown connected to a signal source 55. The signal source 55 in this FIG. is represented as an antenna, though it can be seen by those familiar in the art that other signal sources such as cable television, satellite dishes, and the like could also be utilized. The tuner 50 produces a first audio-video composite signal 60 which is routed to, and terminated on a splitter 65. The splitter 65 then in turn routes a second audio-video composite signal 70 to the record/playback module 45 and a third audio-video composite signal 75 to a source selector switch/mixer 80. The source selector switch/mixer 80 receives its other input from the output of the record/playback module 45 via a fourth audio-video composite signal 85. The output of the fourth audio-video composite signal 85 is a fifth audio-video composite signal 90 which is routed to the monitor screen 15 and displayed as either a full screen picture in the case of the source selector switch/mixer 80 routing the third audio-video composite signal 75 or as a full screen or picture-in picture screen in the case of the source selector switch/mixer 80 routing the fourth audio-video composite signal 85. The control functions of the tuner 50, the record/playback module 45, and the source selector switch/mixer 80 are all controlled by a function control unit 95. The function control unit 95 receives its commands from the control section module 20 and its associated infrared interface 30 via an input control signal 100 and routes the resultant commands via a series of control signal path 105 to the above said components. The control section module 20 also provides the "stop frame" function of freezing the broadcast image on the monitor screen 15 internal to the said monitor screen 15. Such commands control functions such as playback or record mode of the record/playback module 45, channel selection of the tuner 50, feed source location of the source selector switch/mixer 80 and other such functions. Functions such as volume, picture adjustment, etc. would occur in a conventional manner internal to the monitor screen 15 and the control section module 20. Located inside the record/playback module 45 is a video recording/playback mechanism 110 of conventional analog design which possesses a continuous loop cassette 115 of sufficient duration to record the necessary time of broadcast of material in a high quality mode. A frame grabber digitizer circuit 116 accesses an analog video signal 117 from the monitor screen 15 and a digitizer control signal 118 from the function control unit 95 and provides a printer signal 119 to the printing means 47. It is by the printing means 47 that the user accesses a hard copy printed image of the broadcast image.

Figure 3:
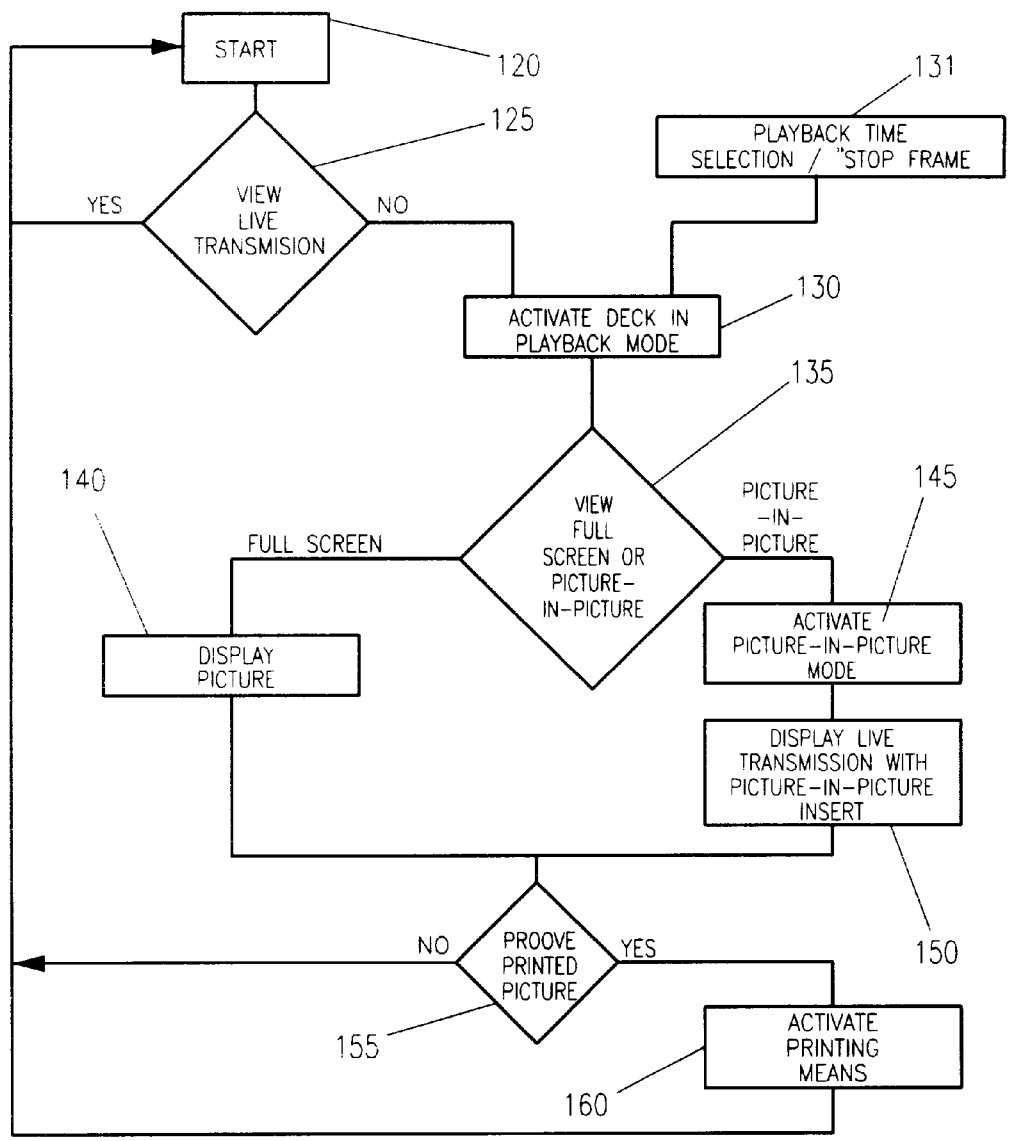
FIG. 3 is a functional logic diagram depicting the operating sequence of the present invention.

Referring finally to FIG. 3, a functional logic diagram depicting the operating sequence of the continuous delay television picture display apparatus 5 is depicted. A first function block 120 and a first decision block 125 form a loop in which viewing of the continuous delay television picture display apparatus 5 (not shown in this FIG.) occurs in a manner normal to a conventional television set. When a decision to reach a replayed image is received via the control section module 20(not shown in this FIG.), the negative output of the first decision block 125 causes a second function block 130 to activate the record/playback module 45(not shown in this FIG.) in a playback mode for a selected period of playback time or a "stop-frame" freeze mode as selected by the user through a third function block 131. This said action causes a second decision block 135 to select between full screen playback via a fourth function block 140 or picture-in-picture playback. In the case of a full screen playback, the stored image is portrayed in a full screen format. In the case of picture-in-picture playback mode, a fifth function block 145 and a sixth function block 150 activate the previously viewed image from the record/playback module 45(not shown in this FIG.) in the picture-in-picture screen and the live transmission in the full screen. Before the process is repeated, a third decision block 155 provides an opportunity for the user to obtain a printed image of the televised image. Upon receipt of a positive response, a seventh function block 160 is enabled and an image is produced. From the seventh function block 160 or a negative response from the third decision block 155, a loop is then established back to the first function block 120 which continues until changed viewer intervention at the first decision block 125. Such replaying will hence continue for repeated cycles of the continuous loop cassette 115(not shown in this FIG.) thus allowing the viewer to repeatedly watch the previously viewed material. Such action would allow the viewer to absorb information such as a telephone number, and then review it during the next playback cycle of the record/playback module 45(not shown in this FIG.) to make sure it was interpreted correctly.

2. Operation of the Preferred Embodiment

In operation, the present invention can be easily utilized by the common user in a simple and effortless manner. To use the present invention with its preferred embodiment can best be described in conjunction with the perspective view of FIG. 1, the schematic block diagram of FIG. 2 and the functional logic diagram of FIG.3.

The user would first begin utilization of the continuous delay television picture display apparatus 5 by applying power to the continuous delay television picture display apparatus 5 in a conventional manner through the control section module 20 or its associated infrared interface 30. Channel selection would then also be made in a conventional manner. Whatever channel is being viewed is also being recorded on the record/playback module 45. The record/playback module 45 is always operating in either a record mode or a playback mode whenever the continuous delay television picture display apparatus 5 is activated. Viewing of the continuous delay television picture display apparatus 5 at this point occurs in a normal manner. If channel selection is changed, the record/playback module 45 will continue to record the changed channel in a looping format.

During an instance of missed programming, the viewer would activate the review activation switch bank 25 on the control section module 20 or its corresponding switch through the infrared interface 30, and thus review the previously transmitted material. This replay time period is governed by the user and would continue to replay over and over again until the viewer deactivates the review activation switch bank 25 on the control section module 20 or its corresponding switch through the infrared interface 30 again. Before returning to the normal state, the viewer at this point has the option of directing a "stop-frame" freeze of the displayed television image to view a discrete moment in time or has the option of directing a hard copy printout to occur via the printing means 47. After all the above said decisions and resultant actions have been made, the record/playback module 45 would return to its recording state and begin recording the live transmission material again. The above process would then repeat at this point.

The foregoing description is included to illustrate the operation of the preferred embodiment and is not meant to limit the scope of the invention. The scope of the invention is to be limited only by the following claims.

IN THE UNITED STATES PATENT AND TRADEMARK OFFICE

Utility Patent Application—Parts List
[For Reference Only—not intended to be part of the Specification]
In re Application of: Christine Kram
Title: Continuous Delay Television Picture Display Apparatus
Label No. Part
5 continuous delay television picture display apparatus
10 television receiver
15 monitor screen
20 control section module
25 review activation switch bank
30 infrared interface
35 picture-in-picture insert
40 review function status area
45 record/playback module
47 printing means
48 printing output port
50 tuner
55 signal source
60 first audio-video composite signal
65 splitter
70 second audio-video composite signal
75 third audio-video composite signal
80 source selector switch/mixer
85 fourth audio-video composite signal
90 fifth audio-video composite signal
95 function control unit
100 input control signal
105 control signal path
110 video recording/playback mechanism
115 continuous loop cassette
116 frame grabber digitizer circuit
117 analog video signal
118 digitizer control signal
119 printer signal 120 first function block
125 first decision block

IN THE UNITED STATES PATENT AND TRADEMARK OFFICE

Utility Patent Application—Parts List (Continued)
[For Reference Only—not intended to be part of the Specification]
Application of: Christine Kram
Title: Continuous Delay Television Picture Display Apparatus
Label No. Part
130 second function block
131 third function block
135 second decision block
140 fourth function block
145 fifth function block
150 sixth function block
155 third decision block
160 seventh function block

What is claimed is:

1. A continuous delay television picture display apparatus comprising:

a television receiver having a monitor screen and a control section module, said control section module including a power switch, volume control, channel selections, menu selector, wherein said television receiver includes a tuner which produces a first audio-video composite signal which is routed to, and terminated on a splitter, said splitter communicating to a second audio-video composite signal to a record and playback module, and a third audio-video composite signal to a source selector switch/mixer, and wherein said source selector switch/mixer receives another other input from the output of the record and playback module via a fourth audio-video composite signal, and wherein the output of the fourth audio-video composite signal is a fifth audio-video composite signal which communicates with said monitor screen and displayed as either a full screen picture in the case of the source selector switch/mixer routing the third audio-video composite signal or as a full screen or picture-in picture screen in the case of the source selector switch/mixer routing the fourth audio-video composite signal;

a review activation switch bank, said review activation switch bank being capable of activating a review function of the continuous delay television picture display apparatus;

an infrared interface which interfaces to a remote control unit for controlling said control section module and said review activation switch bank by said infrared interface; and a record and playback module, the record and playback module being capable of allowing for the effective reviewing of images just viewed, during a time period of short duration, which is variable in nature as selected by the user.

2. The continuous delay television picture display apparatus of claim 1, further comprising:

a frame grabber digitizer circuit, said circuit accesses an analog video signal from the monitor screen; and a digitizer control signal communicating with said control section module, and wherein said digitizer control signal provides a printer signal to said printing means such that a user is capable of accessing a hard copy printed image of a broadcast image.

3. A continuous delay television picture display apparatus comprising:

a television receiver having a monitor screen and a control section module, said control section module including a power switch, volume control, channel selections, menu selector, wherein said television receiver includes a tuner which produces a first audio-video composite signal which is routed to, and terminated on a splitter, said splitter communicating to a second audio-video composite signal to a record and playback module, and a third audio-video composite signal to a source selector switch/mixer, and wherein said source selector switch/mixer receives another other input from the output of the record and playback module via a fourth audio-video composite signal, and wherein the output of the fourth audio-video composite signal is a fifth audio-video composite signal which communicates with said monitor screen and displayed as either a full screen picture in the case of the source selector switch/mixer routing the third audio-video composite signal or as a full screen or picture-in picture screen in the case of the source selector switch/mixer routing the fourth audio-video composite signal;

a review activation switch bank, said review activation switch bank being capable of activating a review function of the continuous delay television picture display apparatus;

an infrared interface which interfaces to a remote control unit for controlling said control section module and said review activation switch bank by said infrared interface;

the record and playback module, said record and playback module being capable of allowing for the effective reviewing of images just viewed, during a time period of short duration, which is variable in nature as selected by the user; and printing means for producing a hard copy, printed image of any selected still image present on the monitor screen.

4. The continuous delay television picture display apparatus of claim 3, wherein said printing means includes a member of the group comprising laser printers, inkjet printers, and thermal printers.

5. The continuous delay television picture display apparatus of claim 3 wherein said record and playback module utilizes a continuous loop of tape recording media, and wherein the output signal from said television tuner is communicated simultaneously to both said television monitor and said video recording system.

6. A continuous delay television picture display apparatus comprising:

a television receiver having a monitor screen and a control section module, said control section module including a power switch, volume control, channel selections, menu selector, wherein said television receiver includes a tuner which produces a first audio-video composite signal which is routed to, and terminated on a splitter, said splitter communicating to a second audio-video composite signal to a record and playback module, and a third audio-video composite signal to a source selector switch/mixer, and wherein said source selector switch/mixer receives another other input from the output of the record and playback module via a fourth audio-video composite signal, and wherein the output of the fourth audio-video composite signal is a fifth audio-video composite signal which communicates with said monitor screen and displayed as either a full screen picture in the case of the source selector switch/mixer routing the third audio-video composite signal or as a full screen or picture-in picture screen in the case of the source selector switch/mixer routing the fourth audio-video composite signal;

a review activation switch bank, said review activation switch bank being capable of activating a review function of the continuous delay television picture display apparatus;

an infrared interface which interfaces to a remote control unit for controlling said control section module and said review activation switch bank by said infrared interface;

the record and playback module utilizing a continuous loop of tape recording media, and wherein the output signal from said television tuner is communicated simultaneously to both said television monitor and said video recording system.

7. The continuous delay television picture display apparatus of claim 6, further comprising printing means for producing a hard copy, printed image of any selected still image present on the monitor screen.

8. The continuous delay television picture display apparatus of claim 7, wherein said printing means includes a member of the group comprising laser printers, inkjet printers, and thermal printers.

* * * * *